Sept. 11, 1962    E. M. BRIGHT    3,053,717
REINFORCED CONTINUOUS SHEETING AND THE METHOD
AND APPARATUS FOR MAKING SAME
Filed May 1, 1958    2 Sheets-Sheet 1
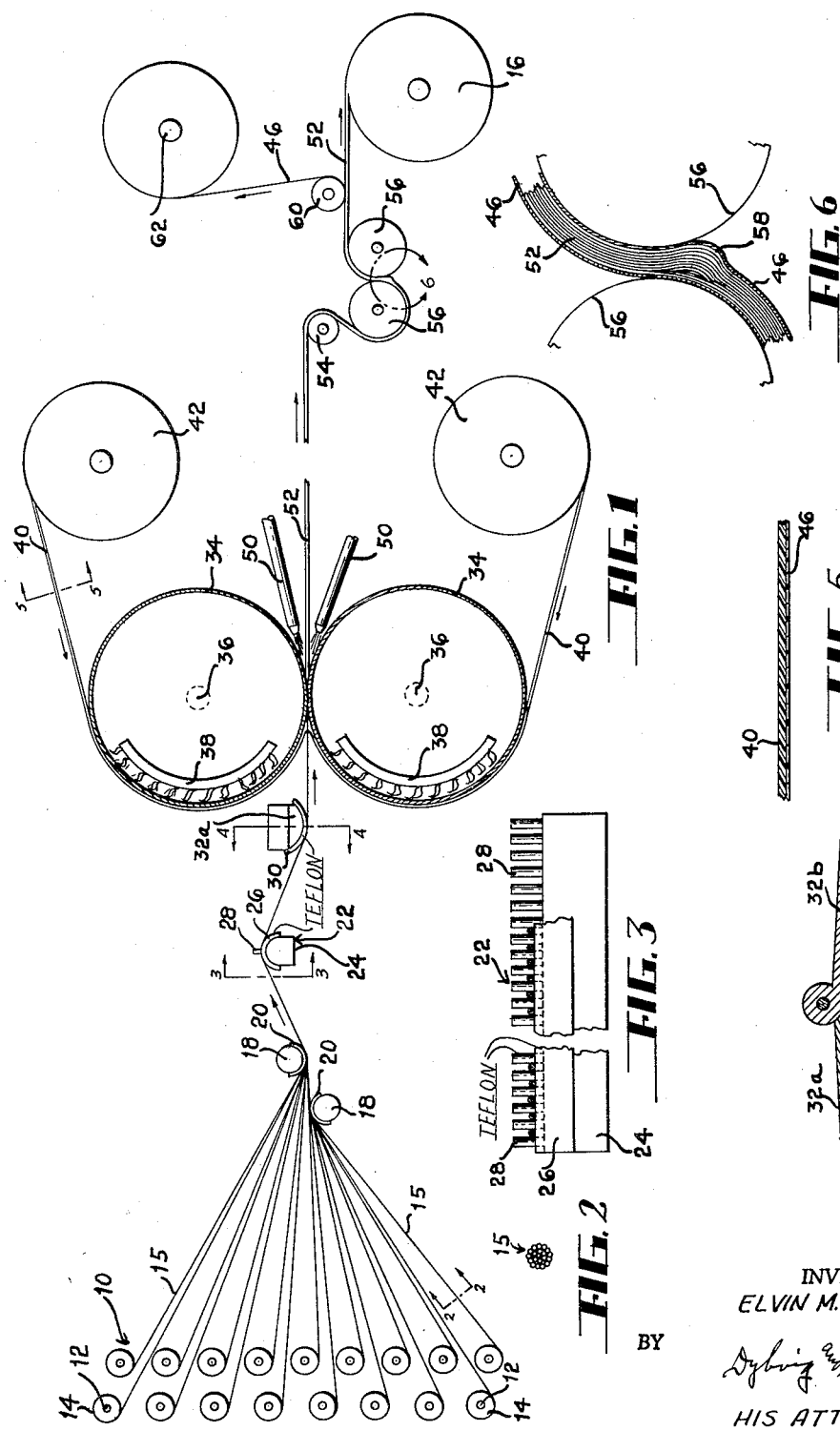
INVENTOR.
ELVIN M. BRIGHT
BY
HIS ATTORNEYS

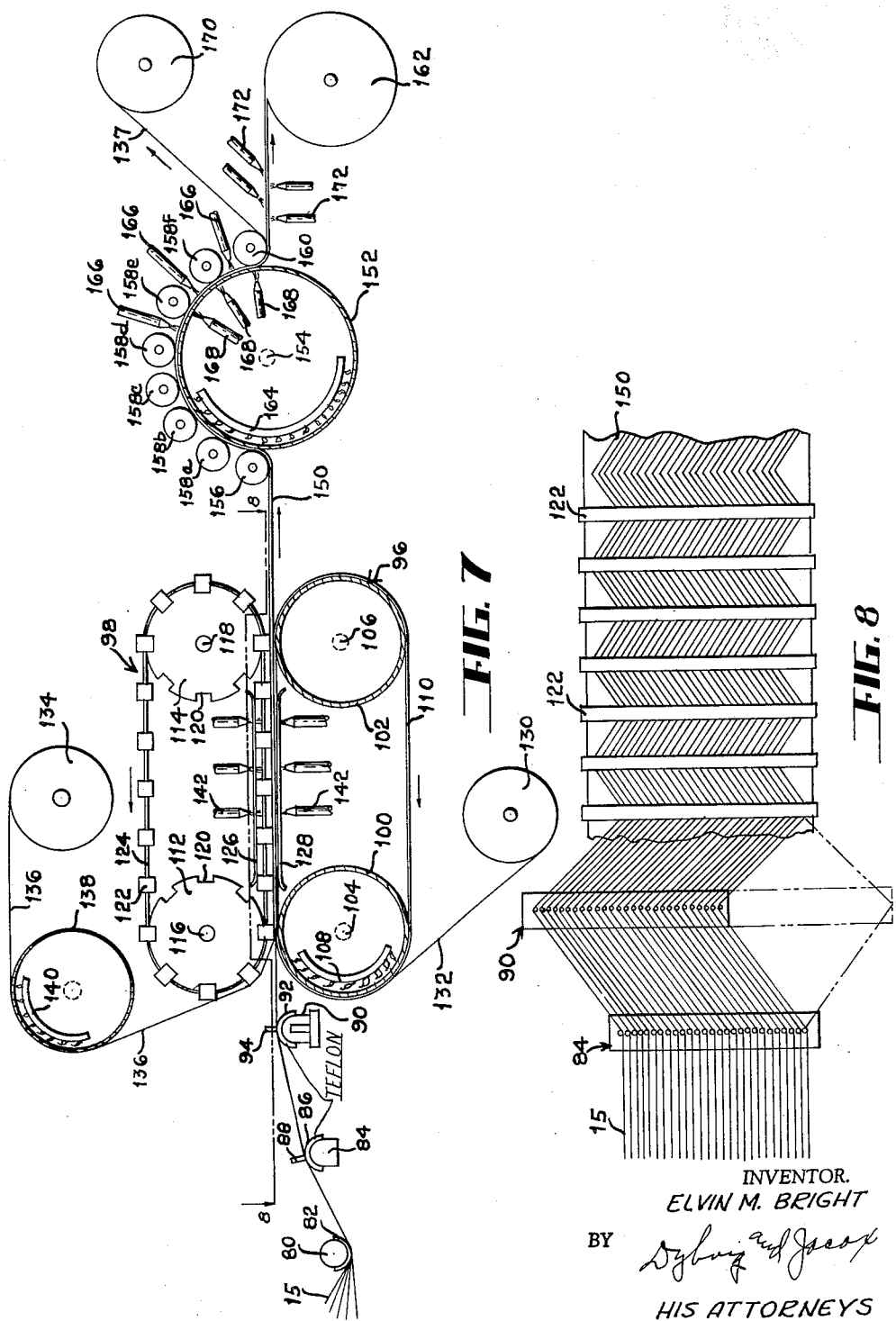

United States Patent Office 3,053,717
Patented Sept. 11, 1962

3,053,717
REINFORCED CONTINUOUS SHEETING AND THE
METHOD AND APPARATUS FOR MAKING SAME
Elvin M. Bright, North Hollywood, Calif., assignor to
Air Logistics Corporation, a corporation of Delaware
Filed May 1, 1958, Ser. No. 732,323
15 Claims. (Cl. 154—52)

This invention relates to the fabrication of plastic sheets reinforced with glass fibers, and more particularly to a new and improved method and apparatus for distributing glass fibers in a plastic sheet in a predetermined orientation.

An object of this invention is to provide a method and apparatus for distributing glass fibers in a plastic so as to form a reinforced plastic sheet wherein the plastic is handled in the form of a hot melt as contrasted with a solvent solution.

Another object of this invention is to provide a method and apparatus for distributing glass fibers in a plastic sheet in a parallel array, wherein the glass fibers are worked into the sheet through the application of heat and pressure.

Still another object of this invention is to provide a novel method and apparatus for straightening glass fibers immersed in a plastic sheet.

A further object of this invention is to provide a method and apparatus for reinforcing a plastic sheet with glass fibers, wherein the glass fibers are distributed in the plastic sheet in an oscillating pattern so as to produce a reinforced plastic sheet which, upon being subjected to deep draw molding or the like, is reinforced with straight parallel glass fibers for maximum structural strength.

Still a further object of this invention is to provide a method and apparatus for forming glass fiber rovings into a uniform sheet of parallel glass fibers for use in reinforcing plastic sheets, wherein deleterious abrasion of the individual glass fibers is minimized.

Still another object of this invention is to provide a new and improved plastic sheet which is a viscous solid at room temperature and which has thermoplastic properties at elevated temperatures, and which is reinforced with glass fibers oriented in a parallel pattern.

Still a further object of this invention is to provide a plastic sheet reinforced with parallel glass fibers distributed within the sheet in an oscillating pattern.

Other objects and advantages reside in the construction of parts, the combination thereof, the method of manufacture and the mode of operation, as will become more apparent from the following description.

In the drawings, FIGURE 1 is a side elevational view illustrating schematically an apparatus for reinforcing plastic sheets with parallel glass fibers.

FIGURE 2 is an enlarged sectional view taken substantially along the line 2—2 of FIGURE 1.

FIGURE 3 is an enlarged sectional view taken substantially along the line 3—3 of FIGURE 1.

FIGURE 4 is a sectional view taken substantially along the line 4—4 of FIGURE 1.

FIGURE 5 is an enlarged sectional view taken substantially along the line 5—5 of FIGURE 1.

FIGURE 6 is an enlarged fragmentary detail view of the area bounded by the arcuate line 6 of FIGURE 1.

FIGURE 7 is a side elevational view illustrating schematically an apparatus for reinforcing plastic sheets with parallel glass fibers wherein the glass fibers are arranged in a herringbone pattern.

FIGURE 8 is a fragmentary plan view of the apparatus of FIGURE 7 taken in the direction indicated by the line 8—8 of FIGURE 7.

The present invention evolved from efforts to develop a thermosetting resinous sheet reinforced with glass fiber strands, which sheet would have good tensile strength, good interlamina shear strength, could be readily laminated and cross plied, and which would be initially in a substantially unpolymerized state thus affording maximum flexibility as regards the end use of the reinforced sheet. In a sheet including parallel glass fiber reinforcement, as described herein, the tensile strength is determined largely by the tensile strength of the glass fibers going into the sheet. To obtain optimum tensile strength, therefore, it was found necessary to devise apparatus for distributing the glass fibers in the resinous sheet with a minimum of abrasion to the glass fibers.

To obtain high interlamina shear strength in the reinforced resin sheet, it was necessary to devise apparatus for introducing the glass fibers into the resin sheet in the absence of moisture or other chemical solvents so as to obtain optimum adhesion between the glass fiber surfaces and the resin of the sheet. To obtain good compression strength as well as tensile strength in the glass fiber sheet, the glass fibers reinforcing the sheet are preferably as straight as possible. With this objective in mind, means were devised for straightening the glass fibers after they had been distributed in the resinous sheet.

In the practice of the invention, which is to be described in the following, resins which have thermoplastic properties at elevated temperatures and which are viscous solids at room temperature are employed. The term "viscous solid" is used herein to designate a material which has sufficient stiffness or rigidity to retain its own shape, but which will flow as a liquid under the application of pressure. Both thermoplastic and thermosetting resins can be tailored so as to have the necessary characteristics.

In the case of thermoplastic resins, commerical formulations of these resins are commonly tailored so that the resin will be rigid at room temperature but will soften at elevated temperatures. Several techniques well known to those skilled in the art are available for converting such commercially prepared resins to a form compatible with the present invention. One method is to only partially polymerize the resin such that it will be a viscous solid at room temperature as opposed to a rigid substance at room temperature. A less preferable method is to soften fully polymerized resin with a solvent. Another method applicable with such resins as styrene is to blend the polymeric form with the monomeric form at elevated temperatures, thereby obtaining what is, in effect, a partially polymerized resin. A thermoplastic resin formulation having characteristics suitable for the practice of the present invention may be obtained by blending three parts of styrene polymer with one part of styrene monomer.

In the case of thermosetting resins, the resin is tailored so as to be a viscous solid at room temperature which will soften at elevated temperatures below the range of temperatures in which polymerization takes place. In the following, two examples of thermosetting resin formulations which have been tailored for use in the practice of the present invention are given. One of these is a polyester resin and the other is a phenol formaldehyde resin. It is to be understood that these formulations are given as mere examples of the type of resin which is used in the preferred practice of this invention. It will occur to one skilled in the art that many other types of resins may be tailored for use in the present invention, and that many variations of the specific preparations given herein may be used to accomplish similar results.

EXAMPLE I

*Polyester Resin*

A mixture of 4 parts by weight maleic anhydride, 3 parts by weight isophthalic acid, and 2 parts by weight ethylene glycol is cooked for 12 hours at 450° F. and 100 p.s.i. in an atmosphere of carbon dioxide. This blend may then be cooled to room temperature for indefinite storage. When the blend is to be put into use, it is heated to a temperature of 135–145° F., then 10% by weight of diallyl phthalate and 2% by weight of dicumyl peroxide is added.

This preparation is coated as a hot melt at 150° F. by any suitable apparatus to produce a resin sheet which is a viscous solid at room temperature, which softens on the application of heat, and which polymerizes in the temperature range of 200–300° F.

EXAMPLE II

*Phenol Formaldehyde Resin*

In the preparation of this resin, trimethylolphenol, and phenol formaldehyde novolak is employed. The trimethylolphenol is separately treated to extract substantially all of the moisture and other volatiles therein as taught in my copending application, Serial No. 682,173, filed September 5, 1957, for Apparatus and Method of Removing Water from Phenol Resins.

Following this extraction, 65 parts by weight phenol formaldehyde are blended with 35 parts by weight trimethylolphenol at a temperature of 150° F. To this blend the following is added: (1) 2% by weight of diallyl phthalate; (2) 0.6% by weight of magnesium oxide, which may be dispersed in a carrier such as allyl glycidol ether for convenience; (3) 0.5% by weight of aluminum or calcium stearate; and (4) 15% by weight of asbestos filler.

This preparation is coated as a hot melt at 150° F. by any suitable apparatus to produce a resin sheet which is a viscous solid at room temperature, which softens on the application of heat, and which polymerizes in the temperature range 260° to 300° F.

In both the above preparations suitable pigments may be employed as desired. The allyl glycidol ether forms a good vehicle for carrying such pigments into the mixture.

Both resin formulations are preferably coated on a carrier web which does not adhere strongly to the resin layer. Polyethylene film, 1–3 mils thick, is found suitable as a carrier. Since the coating is applied at a temperature materially below the temperature range in which polymerization takes place rapidly, the sheet film may be prepared with no substantial polymerization taking place.

The method and apparatus which is the subject of this invention is used to reinforce the resin sheets produced as above with glass fibers. This method and apparatus will now be described in detail.

Referring to FIGURE 1, the reference numeral 10 designates a creel, shown schematically, from which glass fiber rovings are drawn for eventual immersion into the plastic sheet. The creel 10 comprises a plurality of skewers 12 which support rolls 14 of glass fiber rovings 15. As is illustrated in FIGURE 2, the glass fiber rovings are essentially a loose bundle of numerous parallel glass fiber filaments.

The glass fiber rovings are drawn from the creel by means of a driven windup roll 16 illustrated to the right of FIGURE 1. These rovings as they are drawn from the creel are guided into parallel arrangement in the form of a sheet by means of fixed bars 18 covered with Teflon sheets 20. Teflon surfaces are used for the reason that Teflon has an extremely low coefficient of friction in contact with glass fibers. Accordingly, abrasion of the individual glass fiber strands forming the glass fiber rovings is minimized.

The parallel glass fiber rovings, now in the form of a sheet, are distributed into a uniform sheet of the desired width by means of a comb illustrated at 22. This comb comprises a fixed supporting bar 24 covered with a Teflon (polytetrafluoroethylene) sheet 26 through which projects a plurality of spaced parallel pins 28 coated with Teflon tubing. As illustrated in FIGURE 3, a single glass fiber roving is threaded between each pair of adjacent pins 28.

From the comb 22 the glass fiber rovings, now in a uniform parallel array, are drawn over an antifriction surface established by a curved Teflon sheet 30. This Teflon sheet 30 is supported by a pair of hingedly joined arms 32a and 32b, best illustrated in FIGURE 4. For reasons which will become more apparent in the following, the arms 32a and 32b are adjustable so as to vary the angle therebetween.

The function of the Teflon surface 30 is as follows. The glass fiber rovings drawn from the creel 10 by the windup roll 16 are under a slight tension created by friction between the skewers 12 and the rollers 14 associated with the creel. Due to the arcuate path taken over the surface 30, the glass fiber rovings press against this surface with a force proportional to the dewind tension associated with the creel 10. Since Teflon has an extremely low coefficient of friction in contact with glass fibers, the individual glass fibers making up the several glass fiber rovings will spread out upon the antifriction surface 30 into a uniform sheet with the glass fiber rovings losing their identity. The effect is illustrated schematically in the section view of FIGURE 4. This spreading effect is accomplished without any substantial abrasion of the individual glass fibers.

The glass fiber sheet moving away from the antifriction surface 30 to the right, as viewed in FIGURE 1, is a sheet of parallel glass fibers of substantially uniform thickness. This sheet is drawn into the nip between two large drums 34 which are held in pressured relation, that is, one drum pressing against the other. The drums 34 are freely rotatable on axles 36.

Fixedly mounted within each of the drums 34 is a gas burner 38 which is used for heating the inner periphery of the drum. It is to be understood that, while gas burners 38 are illustrated in the present apparatus, any suitable means may be employed for heating the peripheries of these drums 34.

Resin, which is to be blended into the glass fiber sheet, is supplied in the form of continuous sheets 40 from dewind rolls 42, there being one dewind roll associated with each drum 34. As noted hereinbefore, these resin sheets are tailored to be viscous solids at room temperature and to have thermoplastic properties at elevated temperatures. As best illustrated in FIGURE 5, the resin sheets are supported upon a carrier web 46, which, as indicated previously, may be polyethylene.

As illustrated, the sheets 40 are drawn by the windup roll 16 around the drums 34 and through the nip therebetween along with the glass fiber sheet. As the sheets 40 come in contact with the drums 34, the carrier webs 46 engage the drums with the resin layers being to the outside of the drums. The heat applied to the drums 34 by the gas burners 38 is transmitted to the resin layers through the carrier webs 46 with the result that the resin softens.

At the nip between the drums 34 the two softened resin layers are compressed against the glass fiber sheet.

Due to the fact that the drums 34 are of large diameter, the resin layers initially contact the glass fiber sheet with little or no force, but as they are drawn into the nip between the drums this force increases gradually until, when the resin and glass fiber sheets are directly between the drums 34, they absorb substantially all of the force with which the drums 34 are pressed together.

In the construction of this apparatus, it is essential that the drums 34 have a large enough diameter to give the desired gradual increase of contact force between the resin and glass sheets. If the glass fiber sheet alone were passed through the drums 34, the individual glass fibers making up the sheet would abrade one another to such an extent that the sheet after passing through the drums 34 would have little or no tensile strength. By gradually squeezing the resin into the glass fiber sheet, as occurs in the present process, the resin lubricates the individual glass fiber strands as they are drawn into the nip between the rollers 34, preventing abrasion of the glass fibers as would result if the glass fibers were permitted to rub one against the other without lubrication.

The amount of resin blended with the glass fiber sheet is carefully adjusted. If too much resin is used, the sheet will lack tensile strength. If insufficient resin is used, the sheet will lack interlamina shear strength. Generally, the optimum glass to resin ratio is approximately three to one by weight. This ratio can be controlled and adjusted in two ways. One method is to control the thickness of the resin layers 40. The other method is to control the thickness of the glass fiber sheet formed over the antifriction surface 30. It is found preferable to control the thickness of the resin layers 40 as a coarse control over the glass to resin ratio, and to adjust the density of glass fibers formed into a sheet over the antifriction surface 30 as a fine control over the glass to resin ratio.

To effect this latter adjustment the angle between the hingedly joined arms 32a and 32b supporting the antifriction surface 30 is adjusted. When this angle is increased, the density of glass fibers in the glass fiber sheet is increased. Such increase is accompanied by a decrease in the width of the glass fiber sheet; but this decrease in width is not objectionable for the reason that the edges of the finally formed sheet will ordinarily be trimmed in subsequent operations. Conversely, if it is desired to decrease the thickness or density of the glass fiber sheet, the angle between the arms 32a and 32b is increased.

Emerging from the nip between the drums 34 to the right, as viewed in FIGURE 1, is a substantially uniformly blended sheet 52 of resin and fiber glass, wherein the resin, being at an elevated temperature, is softened. To forestall any polymerization of the resin which may occur at this elevated temperature, jet nozzles 50 are employed to direct a cooling blast of either a gas or a liquid upon the sheet. By this means, the sheet 52 is quickly cooled toward room temperature where the resin is once again a viscous solid. At this point the resin and glass fiber sheet 52 is sandwiched between the two carrier webs 46.

The cooled resin and glass fiber sheet 52 is next passed over a roller 54, then between a pair of rollers 56 mounted in pressured relation. These rollers 56 co-operate to squeegee the resin and glass fiber sheet 52 in such a manner as to straighten the glass fibers therein. Straightening of the glass fibers is necessitated by reason of the fact that the glass fibers are obtained from loose rovings. The dewind load applied to these rovings is absorbed by only a small portion of the total number of strands in the rovings, such that the majority of the strands are free of tension and therefore free to acquire a slight curl as they move through the apparatus. The straightening effect of the rollers 56 is designed to remove, at least in part, the curl thus formed.

As illustrated in FIGURE 6, a slight bead or bulge 58 forms in the resin and glass fiber sheet 52 as it is drawn through the rollers 56. For purposes of illustration, this bead, which forms as a result of the pressure applied by the rollers 56, is exaggerated in the drawings. The pressure utilized is 10–100 pounds per lineal inch of sheet width. Due to the presence of the bead 58 and the movement of the glass fibers through the nip between the rollers 56 a portion of the resin in the sheet 52 is caused to flow longitudinally, and rearwardly relative to the movement of the glass fibers, through the interstices between the glass fibers. This flow, which takes place under considerable hydraulic pressure, exerts a straightening effect on the glass fibers which is analogous to the effect obtained when a liquid under pressure is forced through a flexible conduit. This straightening effect enhances both the tensile and the compression strength of the glass fiber sheet.

In a final operation, one of the carrier webs 46 is stripped from the resin and glass fiber sheet 52 over a roller 60 and wound under tension upon a driven roller 62. The resin and glass fiber sheet is wound on the windup roll 16 using the other carrier web 46 as an interleaving between successive layers of the sheet 52. The resultant product is a resinous sheet reinforced with straight parallel glass fibers. When a thermosetting resin is used, the sheet, when polymerized, has high tensile strength in one direction and, due to the fact that no moisture or solvents have been applied, the sheet has high interlamina shear strength. Such sheets may be cross plied and polymerized to provide flat sheet stock having high tensile strength along two or more dimensions.

Due to the excellent cohesion which is obtained between the resin and the glass fibers, the glass will flow with the resin when the resin is softened to a flowing state and, as a result, a product with excellent molding characteristics may be made by cutting the sheet into chips. Upon either injection or compression molding of the chips the flowing resin will carry the glass fibers to all parts of the mold insuring a molded product having uniform glass fiber reinforcement.

Where a thermoplastic resin is used, it is found advantageous to bulk polymerize the sheet 52 in roll form by the application of heat in an oven or the like, then to dewind the roll while still at an elevated temperature, cutting and stacking the product in flat sheets. The sheets may be laminated, contour molded, or cut into chips for injection or compression molding, as is the case with thermosetting resin sheets.

Since the glass fibers employed to reinforce the sheet 52 materially limit the stretchability of the sheet in the direction parallel to the glass fibers, this sheet has only limited application in contour molding processes. A reinforced resin sheet suitable for contour or deep draw molding may be produced, however, with the apparatus illustrated in FIGURES 7 and 8.

In the apparatus of FIGURE 7, glass fiber rovings 15 are drawn from a creel, not illustrated, which is positioned to the left of the apparatus as illustrated in FIGURE 7. These glass fiber rovings 15 are drawn under a guide bar 80 coated with a Teflon surface 82, then over a comb 84 protected by a Teflon surface 86 and having spaced Teflon coated pins 88 projecting therefrom. This comb 84 is fixedly mounted.

The rovings pass from the comb 84 over a second comb 90 protected by a Teflon surface 92 and having spaced Teflon coated pins 94. As best illustrated with broken line detail in FIGURE 8, this second comb 90 is mounted for reciprocating movement in a direction transverse of the direction of movement of the glass fiber rovings 15 and operates as a shuttle.

From the comb 90 the glass fiber rovings move between a pair of conveyors 96 and 98. The conveyor 96 comprises a pair of spaced drums 100 and 102, the drum 100 being mounted for rotation on an axle 104, and the drum 102 being mounted for rotation on an axle 106. The periphery of the drum 100 is heated by a gas burner 108 mounted stationary within the interior thereof. An endless steel belt 110 is driven by the drums 100 and 102.

The conveyor 98 includes a pair of gear like drums 112 and 114 mounted for rotation in spaced relation on axles 116 and 118, respectively. The drums 112 and 114 are each provided with a plurality of equispaced axially extending channels 120 in the periphery thereof adapted to receive elongate bars 122 which are supported in spaced parallel relation by flexible belts 124. The bars 122 and belts 124 form an endless chain-like assembly adapted to move about the spaced drums 112 and 114.

In operation, the upper conveyor 98 is driven in a counterclockwise direction while the lower conveyor 96 is driven in a clockwise direction, as viewed in FIGURE 7. As these conveyors move, the bars 122 of the upper conveyor 98 are successively laid upon the steel belt 110 of the lower conveyor, moved with this belt throughout the length of the conveyors, then successively lifted off the belt and recycled to reengage the belt 110 at a later time. The conveyors 96 and 98 are arranged so that the bars 122 of the conveyor 98 engage the belt 110 of the conveyor 96 in pressured relationship. Fixedly mounted runners 126 and 128, the former engaging the bars 122 and the latter engaging the belt 110, hold the bars 122 in pressured relation to the belt 110 between the drums at the ends of these conveyors.

The operation of the shuttle comb 90 is synchronized with the operation of the conveyors 96 and 98 as follows. As the conveyors 96 and 98 are in motion, the bars 122 of the upper conveyor are laid one after another on the belt 110 of the lower conveyor. At the instant one bar 122 engages the belt 110, the shuttle comb 90 is at rest at one extreme position thereof. Before the next bar 122 engages the drum 110, the shuttle comb 90 is actuated to the extreme opposite position, where it is at rest when this next bar 122 engages the belt 110. Then the shuttle comb 90 is returned to its original position before the third bar 122 engages the belt 110. The result is that the glass fiber rovings 15 are laid upon the steel belt 110 of the lower conveyor 96 in a herringbone pattern, as illustrated in FIGURE 8, with the bars 122 of the upper conveyor 98 holding this herringbone pattern.

The angularity of this herringbone pattern or, in other words, the length of glass fiber rovings consumed in making each successive segment of the herringbone pattern is regulated by adjusting the total throw of the shuttle comb 90.

Resin, which may be either thermoplastic or thermosetting, but which is tailored to be a viscous solid at room temperature, then to have thermoplastic properties at elevated temperatures below the temperature at which the resin polymerizes, is applied to the herringbone array established between the conveyors 96 and 98 by the following mechanism. Associated with the conveyor 96 is a roll 130 which supplies a resin layer 132 backed with a carrier web in a manner disclosed in the preferred embodiment of FIGURE 1. This resin layer 132 is brought into contact with the steel belt 110 of the conveyor 96 in such a manner as to wrap partially around the heated drum 100. Heat from the gas burners 108, transmitted through the steel conveyor belt 110 and through the carrier web to the resin layer 132 softens the resin layer.

Associated with the conveyor 98 is a roller 134 which supplies a resin sheet 136 backed by a carrier web best illustrated to the right of FIGURE 7 by the reference numeral 137. This resin sheet 136 is drawn over a rotatably mounted drum 138, the periphery of which is heated from the interior by stationary gas burners 140. Heat from these gas burners is transmitted through the wall of the drum 138 and through the carrier web 137 to soften the resin sheet 136. The softened resin sheet 136 wraps partially around the gear-like drum 112 of the upper conveyor 98 as it moves into contact with the glass fiber sheet moving between the conveyors 96 and 98.

The arrangement is such that the rotary movement of the conveyors 96 and 98 draws both the softened resin sheets 132 and 136 into contact with opposite sides of the glass fiber sheet as this sheet is being formed into a herringbone pattern by operation of the shuttle comb 90. As the superimposed resin and glass fiber sheets pass between the conveyors 96 and 98, jets 142 are employed to direct a cooling blast of a gas or liquid to set the resin to a viscous solid. The resin which has been squeezed into the glass fiber sheet at spaced intervals by the bars 122 is then capable of holding the herringbone pattern of the glass fibers such that when the sheet assembly 150, including the glass fiber sheet, the resin layers, and the carrier webs, emerges from the conveyors 96 and 98, the herringbone pattern in the glass fibers is not lost.

As an alternative to the use of cooling jets as shown at 142, the sheet assembly 150, as it emerges from the conveyors 96 and 98 may be engaged compressively by successive cold rollers which press the glass fibers into the resin in the herringbone pattern while simultaneously cooling the resin to a viscous solid.

The sheet assembly 150 moves from the conveyors 96 and 98 onto the periphery of a drum 152, which is mounted upon an axle 154. A plurality of rollers identified with the reference numerals 156, 158a, 158b, 158c, 158d, 158e, 158f and 160 disposed in spaced parallel relation engage the periphery of the drum 152 in pressured relation therewith. Mounted stationary within the drum 152 is a gas burner 162 which supplies heat to the inner periphery of the drum.

In operation, the conveyors 96 and 98 and the drum 152 are driven in synchronization, the arrangement being such that the only tension to which the sheet assembly 150 is subjected in passing from the conveyors 96 and 98 to the drum 150 is that created by its own weight. This tension is absorbed primarily by the carrier webs associated with the sheet assembly so that no distortion of the herringbone pattern in the glass fibers is produced. Preferably, a slight dangle, not illustrated, is provided in the sheet assembly 150 between the conveyors 96 and 98 and the drum 152.

The roller 156 presses against the drum 152 with pressure just sufficient that the sheet assembly 150 will be drawn frictionally by the drum 152. The compression exerted on the sheet assembly by the roller 156 is maintained as low as possible to minimize abrasion of the glass fibers, which, at this point, are not yet thoroughly lubricated by the resin.

The rollers 158a–f engage the periphery of the drum 152 with steadily increasing pressure. That is, the roller 158a engages the periphery of the drum 152 with slight pressure. The roller 158b engages the periphery of the drum 152 with a slightly greater pressure and so on. The heat supplied to the resin of the sheet assembly 150 by means of the gas burner 164 is adjusted to soften the resin by the time it passes under the roller 158a. The rollers 158a–f exert a kneading action upon the sheet assembly 150, functioning to work the softened resin into the glass fiber sheet. The kneading pressure is adjusted to be slight to begin with, so that rubbing of the glass fibers one upon the other with consequent abrasion of the glass fibers is minimized. As the glass fibers are lubricated by the resin, a steadily increasing kneading pressure is exerted by the rollers. By the time the sheet assembly 150 is passing under the rollers 158e and f the resin has been thoroughly worked into the glass fibers.

The sheet assembly 150 is eventually wound under tension upon a driven roll 162. Since the sheet will therefore be subject to tension the instant it separates from the drum 152, it is necessary to set the resin thereof to a viscous solid before it separates from the drum 152. To this end, a plurality of jets 166 and 168 are utilized to direct a refrigerating blast upon the sheet assembly 150 and upon the inner periphery of the drum 152. These refrigerating blasts may be provided either by a gas or a liquid. The jets 166 are directed against the carrier web 137 between the rollers 158d, e, f and 160. The jets 168 are mounted stationary within the drum 152 and directed against the inner periphery thereof opposite the rollers 158e and 160. The degree of refrigeration provided by these jets 166 and 168 is adjusted so that by the time the sheet assembly 150 reaches the roller 160, the resin has been set to a viscous solid. The roller 160 presses tightly against the drum 152 to anchor the sheet assembly 150 against the windup tension.

As the sheet assembly 150 separates from the drum 152 around the roller 160, the upper carrier web 137 is stripped from the sheet assembly and wound upon a driven roller 170. The sheet assembly 150 is wound upon the windup roller 162 using the lower carrier web as an interleaving between the layers of blended resin and glass fiber. Between the drum 152 and the windup roll 162, a plurality of jets 172 are utilized to direct a cooling blast upon the sheet 150 to reduce the temperature of this sheet substantially to room temperature.

While it has been indicated that conveyors 96 and 98, the drum 152, and the windup roll 162 are all driven, it will be apparent that, where the carrier webs have sufficient strength to absorb the requisite driving tension, the drum 152 and the conveyors 96 and 98 may all be driven by power supplied to the windup roll 162.

The herringbone pattern provided in the resin and glass fiber sheet produced with the apparatus illustrated in FIGURES 7 and 8 introduces an amount of stretchability in the resin and glass fiber sheet, not present when straight parallel glass fibers are employed. In this respect the herringbone pattern sheet is particularly suitable for deep draw molding and for contour molding operations.

For example, assume that it is desired to employ straight fiber reinforcing in an object contour molded from flat plastic sheet stock wherein the plastic sheet will be stretched 10% in one direction and 20% in the direction at right angles thereto. It is possible to construct herringbone sheets with the apparatus of FIGURE 7 which, when cross plied and molded, will have substantially straight glass fibers. To accomplish this, a first herringbone sheet is made wherein the ratio of glass fiber length to sheet length is 1.1:1, and a second herringbone sheet is made wherein the ratio of glass fiber length to sheet length is 1.2:1. These sheets are then cross plied, so that the general fiber direction of one sheet is at right angles to the general fiber direction of the other sheet. The resultant sheet will contour mold under the aforesaid conditions to produce straight fiber reinforcement in two directions. Clearly, a number of sheets cross plied at various angles may be required, depending on the complexity of the sheet to be produced and the extent of straight fiber reinforcement sought.

The basic apparatus of FIGURE 7 suggests other possibilities. For example, if the conveyor 98 which intermittently grips the glass fiber sheet so as to give rise to a herringbone pattern were replaced with a conveyor identical to the conveyor 96 and if the shuttle comb 90 were oscillated in a uniform reciprocal manner, the glass fiber sheet would be formed into a type of sinusoidal wave rather than a herringbone pattern. Such a sheet would have the desired deep draw and contour molding characteristics and would in this respect behave like the resin and glass fiber sheet having a herringbone pattern.

It is to be noted, in connection with the apparatus of FIGURE 1 and the apparatus of FIGURE 7, that the pair of drums 34 in the apparatus of FIGURE 1 has a function equivalent to that performed by the drum 152 and associated rollers illustrated in FIGURE 7. It is thus possible to substitute this portion of the apparatus of FIGURE 7 for the pair of drums 34 in the apparatus of FIGURE 1, arranging the modified apparatus so that the resin sheets 40 and the glass fiber sheet of FIGURE 1 merge between the roller 156 and the drum 152 of FIGURE 7. With such a modified apparatus, the pair of straightening rollers 56 employed in the apparatus of FIGURE 1 can be omitted, inasmuch as the function of these rollers will be performed by the roller 160 cooperating with the drum 152. The results obtained with such modified apparatus will be substantially identical with the results obtained with the apparatus of FIGURE 1.

Although the preferred embodiments of this invention have been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. The method of forming an unpolymerized reinforced thermosetting resin sheet embodying a resinous material which is a viscous solid at room temperature and which softens at elevated temperatures below the range of temperatures at which it polymerizes including the steps of drawing a plurality of continuous reinforcing fibers from a creel, forming the fibers into a parallel array, passing the parallel array of fibers over an antifriction surface to spread the fibers into a sheet, forming two separate films of said unpolymerized thermosetting resin, applying heat to the resin films sufficient to soften same but insufficient to initiate polymerization, pressing said films against opposite sides of said fiber sheet to form a resin and fiber sandwich, subjecting the sandwich to gradually increasing rolling pressure to work the resin through the fibers, cooling the resin and fiber sheet, and applying rolling pressure to the cooled resin and fiber sheet in the direction of the length of the fibers therein to straighten the fibers in said sheet.

2. The method of forming a reinforced resin sheet embodying a resinous material which is a viscous solid at room temperature and which softens at elevated temperatures including the steps of forming a plurality of continuous reinforcing fibers into a sheet of parallel fibers, supplying heat to a quantity of said resin sufficient to soften the resin, blending the resin with the fiber sheet so as to saturate the fibers with resin, cooling the blended resin and fiber sheet, and applying rolling pressure to the cooled resin and fiber sheet in the direction of the length of the fibers therein to straighten the fibers.

3. The method according to claim 2, wherein said resin is an unpolymerized thermosetting resin and wherein the temperature to which the resin is heated to soften same is below the range of polymerization temperatures for said resin.

4. The method of reinforcing a resinous sheet, which is a viscous solid at room temperature and which has thermoplastic properties at elevated temperatures, including the steps of advancing the resinous sheet in the direction of its length, advancing a sheet of parallel reinforcing fibers in the direction of the length of said fibers, applying heat to the resinous sheet to soften same, pressing and holding the fibers against the softened resinous sheet at spaced intervals to tack the fibers to the resinous layer, simultaneously oscillating the fiber sheet in a direction transverse of its length in synchronism with the pressing and holding of the fibers against the resinous sheet so as to lay the fibers upon the resinous sheet in a herringbone pattern, and applying gradually increasing pressure to the superimposed fibers and resinous sheet to immerse the fibers in the resinous sheet.

5. The method of manufacturing a resin sheet reinforced with continuous fibers, including the steps of advancing a sheet of parallel fibers in the direction of their length, oscillating the fibers in a direction normal to the length of the fibers, applying pressure at discreet intervals to the opposite sides of the fiber sheet along the length thereof to grip the fibers, said oscillating and said gripping steps occurring in synchronization whereby said fibers are gripped and supported in a herringbone pattern, applying resin to the fibers, and setting the resin to a substantially solid viscous state whereby the resin fixes the herringbone pattern in the fibers.

6. An apparatus for continuously fabricating a resinous sheet reinforced with continuous fibers including, in combination, means for continuously forming said fibers into a sheet of parallel fibers, means for continuously advancing said fiber sheet in the direction of the length of said fibers, means forming said advancing fibers into a herringbone pattern, means temporarily gripping said advancing fibers at spaced intervals so as to hold said herringbone pattern, and means for blending a resinous material with said fibers for fixing the herringbone pattern thereof.

7. An apparatus for continuously fabricating a resinous sheet reinforced with continuous fibers including in combination, means for continuously forming said fibers into a sheet of parallel fibers, means for continuously advancing said fiber sheet in the direction of the length of said fibers, means for temporarily gripping said advancing sheet transversely of the direction of movement thereof at spaced intervals, means synchronized with said gripping means for oscillating said fiber sheet transversely of its length so as to form a herringbone pattern therein, and means for blending a resin into said fiber sheet to fix the herringbone pattern of said fibers.

8. The apparatus according to claim 7, wherein said gripping means comprises an endless carrier belt for receiving said fiber sheet, a plurality of bars, an endless conveyor supporting said bars in spaced parallel relation and advancing said bars in a direction normal to their length whereby said bars are laid successively at spaced intervals on the fiber sheet carried by said belt, moved with the fiber sheet through a predetermined distance, then removed successively from said fiber sheet, and means for pressing said carrier belt and the bars laid on said sheet by said conveyor together so as to grip said fiber sheet at spaced intervals throughout the predetermined distance, and wherein said oscillating means comprises a shuttle mechanism including a comb engaging said fiber sheet, said shuttle mechanism reciprocating said comb transversely of the direction of movement of said fiber sheet between opposite extreme positions in synchronism with said conveyor, the construction and arrangement being such that said comb is moved from one extreme position to the opposite extreme position each time a bar is laid upon said fiber sheet by said conveyor.

9. A resinous sheet reinforced with parallel continuous fibers adapted for use in deep draw molding processes, said sheet comprising a resin layer having thermoplastic properties, and a plurality of continuous reinforcing fibers arranged in a herringbone pattern at least partially immersed in said resin layer.

10. The resinous sheet according to claim 9, wherein the resin of said resin layer is an unpolymerized thermosetting resin which is a viscous solid at room temperature and which has thermoplastic properties at elevated temperatures.

11. In an apparatus for continuously fabricating a resinous sheet reinforced with continuous fibers, the resin of said sheet being a viscous solid at room temperature and having thermoplastic properties at elevated temperatures, said apparatus including means supplying a continuous sheet of reinforcing fibers, means supplying a continuous sheet of resin, and means for heating said resin sheet to soften same, a large diameter drum, a plurality of rollers of smaller diameter mounted adjacent said drum and adapted to roll on the periphery thereof, means pressing successive rollers against said drum with successively increasing pressure, and means for drawing said resin and fiber sheets in contacting relation along the periphery of said drum under said rollers, whereby the successive rollers bearing against said drum with increasing pressure press the fibers into the softened resin sheet.

12. In an apparatus for continuously fabricating a resinous sheet reinforced with glass fibers, said apparatus including means for forming a sheet of parallel glass fibers from a supply of glass fiber rovings, and means for immersing the glass fibers in a resin, the improvement wherein the means for forming a sheet of parallel glass fibers includes a creel supporting said rovings in rolls, means for drawing the rovings from said creel, means including a comb for distributing said rovings in a uniform parallel array, means for providing an antifriction surface engaging the parallel rovings in pressured relation for smoothing the glass fiber rovings into a uniform sheet, and adjustable means for bending said antifriction surface along an axis normal to the direction of movement of said glass fiber rovings so as to form said antifriction surface into a cradle for receiving and bunching said glass fiber rovings, the construction and arrangement being such that the density of glass fibers in the sheet formed is thereby adjustable.

13. In a method for producing a contoured article having straight and continuous fiber reinforcement therein, the steps of forming a sheet of moldable plastic material, immersing fibers each of which has a length greater than that of said sheet in said plastic material, and molding said sheet to the contour of said article in a draw mold wherein the sheet is stretched, the stretching of said sheet pulling said reinforcing fibers to a substantially straight condition.

14. In a method for producing a contoured article having continuous parallel fiber reinforcement therein, the steps of forming a sheet of moldable plastic material, immersing a plurality of generally parallel independent reinforcing fibers in said sheet and oscillating each of said fibers in a direction transverse to its length whereby the length of fibers in said sheet exceeds the length of said sheet, and molding said sheet to the contour of said article in a draw mold wherein the sheet is stretched, the stretching of said sheet pulling said reinforcing fibers to a substantially straight and parallel condition.

15. In a method for producing a contoured article having continuous parallel fiber reinforcement therein, the steps of forming a sheet of moldable plastic material, forming a web of continuous parallel reinforcing fibers, pressing said fibers into said sheet progressively in the direction of its length so as to immerse said fibers in said sheet, oscillating said fibers in a direction transverse to their length as they are pressed progressively into said sheet whereby the length of said fibers exceeds the length of said sheet in the general direction of said fibers, and molding said sheet to the contour of said article in a draw mold wherein the sheet is stretched, the stretching of said sheet pulling said reinforcing fibers to a substantially straight and parallel condition.

References Cited in the file of this patent

UNITED STATES PATENTS

| | | |
|---|---|---|
| 2,076,343 | Humpner | April 6, 1937 |
| 2,372,048 | Auxier | Mar. 20, 1945 |
| 2,517,698 | Muskat | Aug. 8, 1950 |
| 2,525,121 | Fletcher | Oct. 10, 1950 |
| 2,539,690 | Boorn | Jan. 30, 1951 |
| 2,561,449 | Ruderman | July 29, 1951 |
| 2,593,553 | Francis | April 22, 1952 |
| 2,631,957 | Francis | Mar. 17, 1953 |
| 2,737,998 | Meanor et al. | Mar. 13, 1956 |
| 2,744,041 | Balchen | May 1, 1956 |
| 2,804,886 | White | Sept. 3, 1957 |
| 2,826,237 | Carlson | Mar. 11, 1958 |